(12) United States Patent
Fredrickson et al.

(10) Patent No.: US 8,993,672 B2
(45) Date of Patent: Mar. 31, 2015

(54) SOFT AND STRONG ELASTOMERIC COMPOSITIONS FROM SEMICRYSTALLINE-AMORPHOUS POLYOLEFIN BLOCK COPOLYMERS

(75) Inventors: Glenn H. Fredrickson, Santa Barbara, CA (US); Edward J. Kramer, Santa Barbara, CA (US); Zhigang Wang, Union City, CA (US)

(73) Assignee: The Regents of the University of California, Oakland, CA (US)

( * ) Notice: Subject to any disclaimer, the term of this patent is extended or adjusted under 35 U.S.C. 154(b) by 494 days.

(21) Appl. No.: 12/080,971

(22) Filed: Apr. 8, 2008

(65) Prior Publication Data

US 2008/0319116 A1 Dec. 25, 2008

Related U.S. Application Data

(60) Provisional application No. 60/907,742, filed on Apr. 9, 2007.

(51) Int. Cl.
| | | |
|---|---|---|
| *C08K 3/20* | (2006.01) | |
| *C08L 51/00* | (2006.01) | |
| *B29C 55/30* | (2006.01) | |
| *B29C 55/12* | (2006.01) | |
| *B29C 47/78* | (2006.01) | |
| *C08J 3/075* | (2006.01) | |
| *C08L 51/06* | (2006.01) | |
| *C08L 53/00* | (2006.01) | |

(52) U.S. Cl.
CPC ............... *C08J 3/075* (2013.01); *C08L 51/06* (2013.01); *C08L 53/00* (2013.01); *C08J 2351/06* (2013.01); *C08J 2353/00* (2013.01); *C08L 2205/03* (2013.01)
USPC ...................... 524/504; 264/210.1; 264/210.7; 264/291; 524/424; 524/515; 524/525; 524/528

(58) Field of Classification Search
USPC ......... 524/500, 504, 505, 424, 515, 525, 528; 525/53, 89; 264/210.1, 210.7, 291
See application file for complete search history.

(56) References Cited

U.S. PATENT DOCUMENTS

| | | | | |
|---|---|---|---|---|
| 3,465,063 | A * | 9/1969 | Shaw et al. .................... | 525/314 |
| 3,832,423 | A * | 8/1974 | Milkovich et al. ............ | 525/286 |
| 5,733,980 | A * | 3/1998 | Cozewith et al. ............. | 525/314 |
| 5,798,438 | A * | 8/1998 | Sawan et al. .................. | 528/483 |
| 6,184,307 | B1 * | 2/2001 | Schisla ........................ | 525/333.1 |
| 6,184,327 | B1 * | 2/2001 | Weng et al. .................... | 526/351 |
| 6,867,253 | B1 | 3/2005 | Chen | |
| 2002/0147284 | A1 * | 10/2002 | Malinge et al. ................. | 526/65 |
| 2004/0127614 | A1 * | 7/2004 | Jiang et al. .................... | 524/270 |
| 2005/0261417 | A1 | 11/2005 | Mezzenga et al. | |
| 2006/0189762 | A1 | 8/2006 | Datta et al. | |

FOREIGN PATENT DOCUMENTS

| | | |
|---|---|---|
| WO | 2006102146 | 9/2006 |
| WO | 2006102150 | 9/2006 |

OTHER PUBLICATIONS

Hotta et al. (Semicrystalline thermoplastic elastomeric polyolefins: Advances through catalyst development and macromolecular design, PNAS, Oct. 17, 2006, vol. 103, No. 42, 15327-15332).*
G. J. Domski, J. M. Rose, G. W. Coates, A. D. Bolig, M. S. Brookhart, *Prog. Polym. Sci.* 32, 30(2007).
A. Hotta, E. Cochran, J. Ruokolainen, V. Khanna, G. H. Fredrickson, E. J. Kramer, Y.-W. Shin, F. Shimizu, A. E. Cherian, P. D. Hustad, J. M. Rose, and G. W. Coates, *Proc. Natl. Acad. Sci.* 103, 15327 (2006).
H.P. Wang, D.U. Khariwala, W. Cheung, S.P. Chum, A. Hiltner and E. Baer, *Macromolecules* 40 DOI: 10.1021/ma061680e (2007).
P. Smith, P. J. Lemstra, B. Kalb, and A. J. Pennings, *Polymer Bull.* 1, 733 (1979).
P. Smith and P. J. Lemstra, *Makromol. Chem.* 180, 2983 (1979).
Ruokolainen, J. et al., Morphology and Thermodynamic Behavior or Syndiotactic Polypropylene-Poly(ethylene-co-propylene) Block Polymers Prepared by Living Olefin Polymerization in: Macromolecules (2005), vol. 38, pp. 851-860.
Japanese Office Action (with English translation) dated Dec. 14, 2012 for Japanese Patent Application No. 2010-503030.

\* cited by examiner

*Primary Examiner* — Ling Choi
*Assistant Examiner* — Chun-Cheng Wang
(74) *Attorney, Agent, or Firm* — Gates & Cooper LLP

(57) ABSTRACT

Polyolefin block and graft copolymers comprised of two or more semicrystalline polyolefin blocks or grafts and one or more amorphous polyolefin blocks can be blended with a low molecular weight fluid diluent that preferentially locates within and swells the amorphous domains of the block or graft copolymer, while preserving the crystallinity of the semicrystalline block domains. After mechanical or thermomechanical processing, such compositions combine softness with high strength and high recoverable elasticity. Compositions are also disclosed whereby the diluent species is removed from the composition, either before or after the mechanical or thermomechanical processing, in order to create a strong elastic material with an ultra-low entanglement density within the amorphous domains.

25 Claims, 15 Drawing Sheets

SOFT AND STRONG ELASTOMERIC COMPOSITIONS FROM SEMICRYSTALLINE-AMORPHOUS POLYOLEFIN BLOCK COPOLYMERS

CROSS REFERENCE TO RELATED APPLICATION

This application claims the benefit of U.S. Provisional Patent Application No. 60/907,742 filed Apr. 9, 2007, which application is herein incorporated by reference in its entirety.

FIELD OF THE INVENTION

The present invention relates generally to the field of polymers. More particularly, it concerns polyolefin block and graft copolymers comprised of semicrystalline polyolefin blocks and (noncrystalline) polyolefin blocks blended with low molecular weight fluid diluents. The invention discloses that mechanical or thermomechanical processing of such "gel compositions" leads to materials with exceptional combinations of softness, recoverable elasticity, and strength. Compositions are also claimed in which the diluents are used as a processing aid, but are then removed from the polyolefin block copolymer to produce polymeric materials with high recoverable elasticity and high strength.

BACKGROUND OF THE INVENTION

Polyolefins, such as various grades of polyethylene and polypropylene, constitute one of the most significant segments of the plastic materials market. Due to the low cost of the monomers (e.g. ethylene and propylene) and the versatility and ease of processing of the materials that can be created by polymerizing them, polyolefins have been widely adopted in a broad range of applications including packaging films and containers, pipes, liners, automotive plastics, wire and cable coatings, and injection and blow molded parts.[1]

In homopolymer form, polyethylene can either be highly crystalline and rigid, e.g. high-density polyethylene (HDPE), or of lower crystallinity but soft, tough, and flexible, as in low-density polyethylene (LDPE). The former consists largely of linear polyethylene (PE) chains, while the polymers in the latter are highly branched. Newer grades of polyethylene, such as the metallocene PEs, are manufactured with catalysts and processes that exert more precise control over molecular weight distribution and degree and type of branching than the traditional HDPE and LDPE materials.

Similarly, many grades and types of polypropylene homopolymer (PP) exist in the marketplace. Because of the stereochemistry afforded by the pendant methyl groups along a PP chain, the types and properties of polypropylenes are more diverse than the case of polyethylene. For example, isotactic (iPP), syndiotactic (sPP), and atactic (aPP) polypropylenes are all manufactured commercially. Materials based on iPP and sPP tend to be more highly crystalline and rigid, while aPP materials are soft with low or no crystallinity. As with the case of PE, polypropylenes manufactured using different processes will differ in molecular weight distribution, degree of branching, processing behavior, and physical properties. Both PE and (tactic) PP materials are deemed "semicrystalline", since the long-chain nature of the molecules and their entanglement characteristics under both melt and solution conditions thwarts complete crystallization. While the solid state morphology of semi-crystalline polyolefins can vary widely and the crystals can adopt various forms, generally a two-domain structure exists in which polymer chains connect and mechanically engage crystalline domains, which are separated by amorphous domains.

Olefinic monomers can also be copolymerized via a variety of chemical processes to create random or statistical copolymers. For example, copolymerizations of ethylene and propylene are used to make a rubbery material known as ethylene-propylene rubber (EPR). Small amounts of higher alpha-olefins, such as 1-hexene, or 1-octene, are also copolymerized with ethylene to create families of soft elastomeric and plastomeric materials with a broad range of applications.

While block and graft copolymers have been commercialized in other families of polymeric materials, most notably the styrenic block copolymers (SBCs) prepared by living anionic polymerization of styrenes, butadienes, and isoprenes, only very recently have synthetic methods for producing polyolefin block and graft copolymers emerged. In the past decade, a variety of "living" alkene polymerization chemistries have been identified, which suppress chain termination and transfer processes so that precise control of molecular weight, molecular architecture, and stereochemistry can be achieved[2]. By means of these catalyst systems and procedures, it is now possible to synthesize a wide variety of semi-crystalline polyolefin block and graft copolymers. For example, triblock copolymers with a linear A-B-A architecture have been prepared in which the A blocks are semicrystalline and either iPP or sPP, and the B blocks are amorphous (non-crystalline) statistical copolymers of ethylene and propylene with a low glass transition temperature (i.e. EPR). Such materials have been shown to have excellent elastomeric properties that are unique among thermoplastic polyolefins.[3]

Arriola and co-inventors from Dow Global Technologies ("Dow patent") disclose a commercially practical system for the preparation of statistical multiblock copolymers consisting of semicrystalline PE blocks alternating with poly(ethylene-r-1-octene) amorphous rubbery blocks[4]. The process involves the use of two single-site catalysts, one for each type of block, and a "chain shuttling agent", which facilitates exchange of growing polymer chains between the two catalyst sites. The Dow process does not rely on living olefin catalysts to create controlled architecture block copolymer materials; rather the statistical nature of the chain shuttling and termination/transfer processes yields block copolymer materials with a distribution of block molecular weights and number of blocks per chain. Nonetheless, it is disclosed that the ethylene-octene statistical multiblock polymers have thermal and mechanical properties that are superior to conventional ethylene-octene random copolymers for applications as thermoplastic elastomers.[5]

Thermoplastic elastomers based on styrenic block copolymers (SBC) are often blended with oils, plasticizers, tackifiers, and other low molecular weight diluents to soften the materials, modify their processing, rheological, and adhesive properties, and to lower their cost. Such "oil extension" produces soft thermoplastic elastomeric materials that can be categorized as gel compositions. Chen of Applied Elastomerics Inc. discloses that gel compositions based on SBCs that contain one or more semicrystalline PE blocks have improved tear resistant properties[6]. However, the Chen patent does not claim gel compositions produced from polyolefin block copolymers.

The Dow patent mentioned above[4] discloses the compounding of polyethylene-poly(ethylene-r-octene) multi-block copolymers with oil to create elastomeric gel compositions that are soft, yet have better heat resistance than gel compositions from a comparison ethylene-octene random copolymer. However, the patent does not disclose the use of mechanical or thermomechanical processing to improve the strength and recoverable elasticity of such polyolefin block copolymer/oil gel compositions, nor does it disclose the use of oils or other diluents as a processing aid that are later removed to create new high strength elastomeric compositions that have an initial elastic modulus at strains less than 1, an elastic tangent modulus at large strains just prior to break, the large strains preferably being greater than 5, the ratio of the tangent modulus prior to break to the initial modulus exceeding 50, and excellent elastic recovery with more than 70% of the large strain deformation recoverable.

In 1979, P. Smith and coworkers[7,8] reported that high molecular weight polyethylene (PE) homopolymer can be processed in dilute solution using a diluent such as decalin to produce a monofilament gel fiber. Subsequent mechanical extension (drawing) of the gel fiber and removal of the diluent by means of a thermal treatment produced highly crystalline fibers with ultra-high strength and high modulus. However, this work did not involve compositions containing polyolefin block copolymers, nor did it produce elastomeric materials.

In the research that led to this invention, we made the unexpected discovery that the gel processing technique developed by P. Smith and coworkers, which had heretofore only been applied to create rigid ultra high-strength fibers and film, could be used in connection with polyolefin block copolymers to create unique elastomeric materials that have a low initial modulus at strains less than 1, a large tangent modulus at large strains just prior to break (those strains exceeding 5), the ratio of the tangent modulus prior to break to the initial modulus exceeding 50, and excellent elastic recovery with more than 70% of the large strain deformation recoverable.

BRIEF SUMMARY OF THE INVENTION

In accordance with the invention, polyolefin block and graft copolymers comprised of two or more semicrystalline polyolefin blocks or grafts and at least one amorphous polyolefin block can be blended with a low molecular weight fluid diluent that preferentially locates within and swells the amorphous domains of the block or graft copolymer, while preserving the crystallinity of the semicrystalline block domains. After mechanical or thermomechanical treatment, the resulting gel composition can possess remarkable mechanical properties, most notably being soft with an initial elastic modulus at strains less than 1, an elastic tangent modulus at large strains just prior to break, the large strains preferably being greater than 5, the ratio of the tangent modulus prior to break to the initial modulus exceeding 50, and excellent elastic recovery with more than 70% of the large strain deformation recoverable. The composition can be thermoplastically formed and easily processed. We anticipate that applications of such gel compositions will be similar to those of flexible polyvinylchloride (PVC) and oil-extended styrenic block copolymer (SBC) elastomers, except that the present invention will potentially allow for softer materials at low strain, higher use temperatures, larger tensile deformations, higher strength, and/or improved elastic recovery.

A second family of compositions is also claimed, whereby the fluid diluent species is removed from the composition, either before or after the mechanical or thermomechanical processing, in order to create a material with an ultra-low entanglement density within the amorphous domains and remarkable combinations of softness and strength. These "gel-extracted" compositions are also characterized by an initial elastic modulus at strains less than 1, an elastic tangent modulus at large strains just prior to break, the large strains preferably being greater than 5, the ratio of the tangent modulus prior to break to the initial modulus exceeding 50, and excellent elastic recovery with more than 70% of the large strain deformation recoverable. The gel-extracted compositions are anticipated to have applications in elastomeric film and fiber where exceptional elastomeric properties and high strength are required.

In one embodiment, a polymer gel composition is comprised of a mixture of (a) one or more semicrystalline polyolefin block copolymers and (b) one or more low molecular weight fluid diluents, where
  (i) each semicrystalline polyolefin block copolymer is an A-B block or graft co-polymeric material comprised of two or more blocks or grafts of a semicrystalline polyolefin A bridged by one or more blocks of an amorphous polyolefin B,
  (ii) each low molecular weight fluid diluent is miscible or partially miscible with the amorphous B blocks of the polyolefin block copolymer(s), and does not dissolve the crystals of the semicrystalline A blocks or grafts of the polyolefin block copolymer at the use temperature, and whose glass transition temperature is below room temperature,
  (iii) the gel composition produced by combining the one or more semicrystalline polyolefin block copolymers and one or more low molecular weight fluid diluents has crystals that can be deformed by a suitable mechanical or thermomechanical process to produce a material with an initial elastic modulus at strains less than 1, an elastic tangent modulus at large strains just prior to break, the ratio of the tangent modulus prior to break to the initial modulus exceeding 50, and
  (iv) those large strains being more than 70% recovered when the stress or restraining force is removed The semicrystalline polyolefin block copolymer can be, but is not limited to, an ABA triblock copolymer, an ABABA pentablock copolymer, or an (AB)n radial block copolymer; or a multiblock copolymer with architecture . . . ABABAB . . . , with block sizes and number of blocks per copolymer determined by a statistical process, and where the number average molecular weight of the A semicrystalline blocks is no less than 500 g/mole and the number average molecular weight of the B amorphous blocks is at least 1000 g/mole; or a graft copolymer comprised of an amorphous B backbone of number average molecular weight greater than 1000 g/mole to which is attached two or more grafts (branches) of semicrystalline polyolefin A, each of 500 g/mole or higher in number average molecular weight and placed regularly or randomly along the B backbone.

The A polymer blocks or grafts are semicrystalline polyolefins that can be, but is not limited to, polyethylene, syndiotactic polypropylene, isotactic polypropylene, isotactic poly(1-butene), syndiotactic poly(1-butene), isotactic or syndiotactic higher alpha-olefins including poly(1-hexene) or poly(1-octene); or isotactic or syndiotactic variants of poly (4-methyl-1-pentene), poly(3-methyl-1-butene), poly(4,4-dimethyl-1-pentene), or poly(vinylcyclohexane).

The amorphous B polyolefin blocks can be, but is not limited to, atactic or regio-irregular polypropylenes; atactic poly(alpha-olefins) including poly(1-butene), poly(1-hexene), or poly(1-octene); polyolefin random or statistical copolymers selected from the group consisting of poly(ethylene-r-propylene), poly(ethylene-r-butene), poly(ethylene-r-pentene), poly(ethylene-r-hexene), poly(ethylene-r-heptene), poly(ethylene-r-isobutylene), and poly(ethylene-r-octene); atactic or regio-irregular random or statistical copolymers formed by copolymerization of propylene with one or more higher alpha-olefins and with or without ethylene; or polyolefin compounds produced by hydrogenation of polyisoprenes, polybutadienes, or their random copolymers.

The amorphous B polyolefin blocks of the above semicrystalline block copolymer can have a glass transition temperature well below room temperature, and the crystals of the A polyolefin blocks or grafts can melt at a temperature significantly above room temperature, such that the semicrystalline block copolymer alone has the mechanical properties of a thermoplastic elastomer.

The above mentioned semicrystalline A blocks or grafts have number average molecular weights that can be preferably from 500-200,000 g/mole and more preferably from 2,000-150,000 g/mole. The above mentioned amorphous B blocks have number average molecular weights that can be preferably from 1,000-500,000 g/mole and more preferably from 3,000-400,000 g/mol.

In the above embodiment, the low molecular weight fluid diluent can be removed from the composition after the A blocks or grafts of the semicrystalline polyolefin block copolymers have crystallized, either before or after the crystals are subsequently deformed by a suitable mechanical or thermomechanical process, to produce a material with an initial elastic modulus at strains less than 1, an elastic tangent modulus at large strains just prior to break, the large strains preferably being greater than 5, the ratio of the tangent modulus prior to break to the initial modulus exceeding 50, and those large strains being more than 70% recovered when the stress or restraining force is removed.

In another embodiment, an A-B polyolefin block or graft copolymer with two or more blocks or grafts of a semicrystalline polyolefin A separated by one or more blocks of an amorphous polyolefin B is mixed with a second C-D polyolefin block or graft copolymer material comprised of two or more blocks or grafts of a semicrystalline polyolefin C separated by one or more blocks of an amorphous polyolefin D, wherein polymers B and D are either the same or different, wherein the low molecular weight fluid diluent is miscible or partially miscible with the amorphous B and D blocks, and does not dissolve the crystals of the semicrystalline A and C blocks or grafts, and wherein the crystals of A and C can be deformed by a suitable mechanical or thermomechanical process.

In this embodiment, the semicrystalline polyolefin block copolymers can be a mixture of an ABA triblock copolymer and a CDC triblock copolymer; or a mixture of a multiblock copolymer of architecture . . . ABABAB . . . having block sizes and numbers of blocks determined by a statistical process, and where the number average molecular weight of the A semicrystalline blocks is greater than 500 g/mole and the B amorphous blocks have a number average molecular weight greater than 1000 g/mole, with a second block copolymer of CDC triblock architecture, or architecture . . . CDCDC . . . having block sizes and numbers of blocks determined by a statistical process, and where the number average molecular weight of the C semicrystalline blocks is greater than 500 g/mole and the D amorphous blocks have a number average molecular weight greater than 1000 g/mole, and including the situation where polyolefin blocks B and D are the same. The compositions can include situations where the amorphous B and D polymer blocks of the semicrystalline block copolymers have glass transition temperatures well below room temperature, and the crystals of the A and C polymer blocks or grafts melt at a temperature significantly above room temperature, such that the semicrystalline block copolymers alone have the mechanical properties of a thermoplastic elastomer.

In these compositions the A and C polymer blocks or grafts are semicrystalline polyolefins that can be, but are not limited to, polyethylene, syndiotactic polypropylene, isotactic polypropylene, isotactic poly(1-butene), syndiotactic poly(1-butene), isotactic or syndiotactic higher alpha-olefins including poly(1-hexene) or poly(1-octene); or isotactic or syndiotactic variants of poly(4-methyl-1-pentene), poly(3-methyl-1-butene), poly(4,4-dimethyl-1-pentene), or poly (vinylcyclohexane).

The amorphous B and D polyolefin blocks can be, but is not limited to, atactic or regio-irregular polypropylenes; atactic poly(alpha-olefins) including poly(1-butene), poly(1-hexene), or poly(1-octene); polyolefin random or statistical copolymers selected from the group consisting of poly(ethylene-r-propylene), poly(ethylene-r-butene), poly(ethylene-r-pentene), poly(ethylene-r-hexene), poly(ethylene-r-heptene), poly(ethylene-r-isobutylene), and poly(ethylene-r-octene); atactic or regio-irregular random or statistical copolymers formed by copolymerization of propylene with one or more higher alpha-olefins and with or without ethylene; or polyolefin compounds produced by hydrogenation of polyisoprenes, polybutadienes, or their random copolymers.

Tg values for the amorphous B and D blocks and diluents should preferably be 10-150 degrees C. below the use temperature and more preferably 50-150 degrees C. below the use temperature. The Tm values of the crystalline A blocks should preferably be 20-250 degrees C. above the use temperature and more preferably 50-200 degrees C. above the use temperature.

The low molecular weight fluid diluents used in the embodiments of the invention can be, but is not limited to, a low molecular weight organic compound with low volatility such as a mineral oil, a paraffin oil, a plasticizer, a low volatility solvent, a tackifier; a low molecular weight organic compound with higher volatility such as decalin; or carbon dioxide in liquid, vapor or supercritical fluid form. These low molecular weight fluid diluents can have molecular weights in the range of 10-5000 g/mole and preferably 10-1000 g/mole. The weight percentage of low molecular weight fluid diluents used in the gel compositions of the invention can be in the range of 15% to 99.9%, preferably in the range of 50% to 99.9%, and most preferably in the range of 80% to 99.9%.

In the above embodiment, the low molecular weight low fluid diluent can be removed from the composition after the A and C blocks or grafts of the semicrystalline block copolymer have crystallized, either before or after the crystals are subsequently deformed by a suitable mechanical or thermomechanical process, to produce a material with an initial elastic modulus at strains less than 1, an elastic tangent modulus at large strains just prior to break, the large strains preferably being greater than 5, the ratio of the tangent modulus prior to break to the initial modulus exceeding 50, and those large strains being more than 70% recovered when the stress or restraining force is removed.

The polymer gel compositions of this invention can be made by mixing one or more semicrystalline polyolefin block or graft copolymers and one or more low molecular weight fluid diluents; heating; annealing; and then cooling the mixture. Another procedure is to mechanically combine one or more semicrystalline polyolefin block or graft copolymers and one or more low molecular weight fluid diluents at elevated temperature using standard polymer processing equipment such as a compounder, mixer, or extruder.

A mechanical or thermomechanical process can convert the polymer gel compositions, formed by the above method, into crystals isolated by the elastomer or gel fluid matrix, in which the crystals are now of a suitable form to produce a very large elastic modulus (tangent modulus) at large strain, a strain that can be more than 80% recovered when the strain is removed. Suitable mechanical processes can include, but are not limited to, simple extension in tension, repeated simple extension in tension and relaxation to zero stress where a larger maximum strain is reached on every cycle of extension and relaxation, biaxial extension, incremental biaxial extension and relaxation as in the simple tension example, extrusion of the material through a suitably shaped die or into a suitably shaped cavity, extrusion of the material through a die followed by application of stretching along the extrusion direction, extrusion of the material through a die followed by application of stretching along both the extrusion direction and the direction transverse to it, deformation leading to a decrease in the thickness of the material by squeezing it between a set of rollers or any sequence of sets of rollers allowing a decrease in thickness, relaxation, a further decrease in thickness, relaxation and so on. A suitable thermomechanical process is one that would impose temperature changes during or in between any of the steps of the mechanical processes outlined above.

In addition, the low molecular weight fluid diluent can be removed from the composition after the blocks or grafts of the semicrystalline polyolefin block copolymers have crystallized, either before or after the crystals are subsequently deformed by a suitable mechanical or thermomechanical process, to produce a material with an initial elastic modulus at strains less than 1, an elastic tangent modulus at large strains just prior to break, the large strains preferably being greater than 5, the ratio of the tangent modulus prior to break to the initial modulus exceeding 50, and those large strains being more than 70% recovered when the stress or restraining force is removed.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
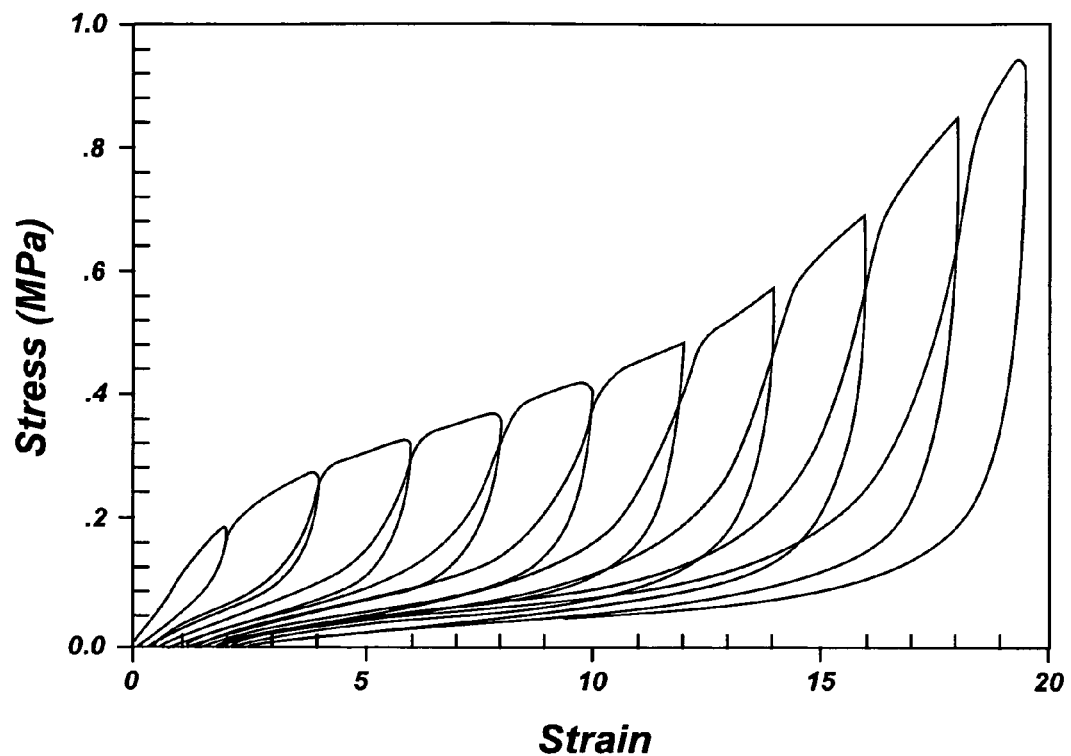
FIG. 1 shows a stress-strain curves of the sPP-b-EPR-b-sPP (TsPP26.357EPR.66)/mineral oil gel (6.0 wt %) during cyclic mechanical processing.

The term "semicrystalline polymer" as used here refers to a polymer whose segments are partially crystallized at room temperature or the use temperature of the material. Examples of semicrystalline polyolefins include polyethylene, isotactic polypropylene, and syndiotactic polypropylene. Such materials do not fully crystallize upon cooling from the melt because of the entangled nature of polymers. Instead, the materials crystallize in a non-uniform way, so that small "crystalline" regions with good chain registry and high crystallinity are separated by "amorphous" regions with liquid-like packing of polymer segments. The shapes, sizes, and geometrical characteristics of the crystalline and amorphous regions can vary widely among different semicrystalline polymers, and with cooling and processing conditions within a single polymer material.

Polyolefin block and graft copolymers comprised of two or more semicrystalline blocks or grafts and one or more bridging amorphous blocks can be blended with a low molecular weight fluid diluent that preferentially locates within and swells the amorphous domains of the block or graft copolymer, while preserving the crystallinity of the semicrystalline block or graft domains. After mechanical or thermomechanical treatment, the resulting gel composition can possess remarkable mechanical properties, most notably being soft with an initial elastic modulus at strains less than 1, an elastic tangent modulus at large strains just prior to break, the large strains preferably being greater than 5, the ratio of the tangent modulus prior to break to the initial modulus exceeding 50, and those large strains being more than 70% recovered when the stress or restraining force is removed. The composition can be thermoplastically formed and easily processed. The applications of such gel compositions can be similar to those of flexible PVC and oil-extended styrenic block copolymer elastomers, except that the present invention will potentially allow for softer materials at low strain, higher use temperatures, larger tensile deformations, higher strength, and/or improved elastic recovery.

A second family of compositions is also disclosed whereby the low molecular weight diluent is removed from the composition, either before or after the mechanical or thermo mechanical processing, in order to create a material with an ultra-low entanglement density within the amorphous domains. These compositions are expected to yield film and fiber with exceptional elastomeric properties and high strength.

EXAMPLE 1

A polymeric material based composition comprised of a polyolefin triblock copolymer, syndiotactic polypropylene-b-ethylene-propylene-rubber-b-syndiotactic polypropylene (sPP-b-EPR-b-sPP), and mineral oil diluent was prepared as follows: A mixture of ~6 weight % sPP-b-EPR-sPP powder in mineral oil (Fisher Chemical, Heavy (USP/FCC) 8042-47-5 paraffin, Fisher Scientific, Fair Lawn, N.J., 07410) was prepared. The mixture was heated in a vacuum oven to 170° C. for 15 h, then annealed sequentially at the following temperatures: 150° C. for 3 h, 120° C. for 2 h and 100° C. for 27 h, then followed by slow cooling in the oven to room temperature. After this treatment the mixture was a clear and transparent gel. The triblock copolymer sPP-b-EPR-b-sPP had a total number average molecular weight Mn of 357 kg/mol, the total weight % of the sPP blocks was 26%, and the crystallinity Xc of the sPP blocks in the undiluted sPP-b-EPR-b-sPP was 28.3% (by DSC measurement). Other details of the polymerization and characterization of the sPP-b-EPR-b-sPP triblock copolymer can be found in Hotta et al.,[9] incorporated herein by reference. This sPP-b-EPR-b-sPP triblock copolymer is abbreviated as TsPP26.357EPR.66. The designation 66 indicates the mole fraction of ethylene (Fe) within the EPR block. Wide angle X-ray scattering showed that the crystallinity of sPP block crystals in the gel was about 0.6% based on the total gel mass. The gel samples were cut into rectangular specimens with thickness of about 0.5 mm, length of 7.3 mm and width of 2.0 mm for the mechanical processing and mechanical testing. The mechanical processing and testing were carried out using an Instron (Norwood, Mass.) 1123 tensile testing machine. The mechanical processing was performed as follows: Tensile cyclic processing was conducted stepwise at room temperature (20° C.) to progressively higher tensile strains. In each step, once the sample reached the appropriate tensile strain, the crosshead direction was reversed and the sample strain was decreased at the same nominal strain rate (~0.07 min$^{-1}$ based on the original sample length) until zero stress was achieved. The sample was then extended again at the same constant strain rate until it reached the next targeted step-strain. The cyclic processing was continued until in the final cycle the targeted strain was reached.

FIG. 1 shows the stress-strain curves during one cyclic mechanical processing treatment. The maximum strains were 2, 4, 6, 8, 10, 12, 14, 16, 18, and 20, respectively. While the gel sample is very elastic with an achievable strain of at least 20 without breakage, the cyclic mechanical processing completely transforms its stress-strain curve at low strains from one with a relatively high initial elastic modulus of ~200 kPa to one with a very low initial elastic modulus of ~3 kPa. The tangent modulus at high strains after the cyclic mechanical processing is much larger, approaching 1 MPa based on the initial sample area.

Figure 2:
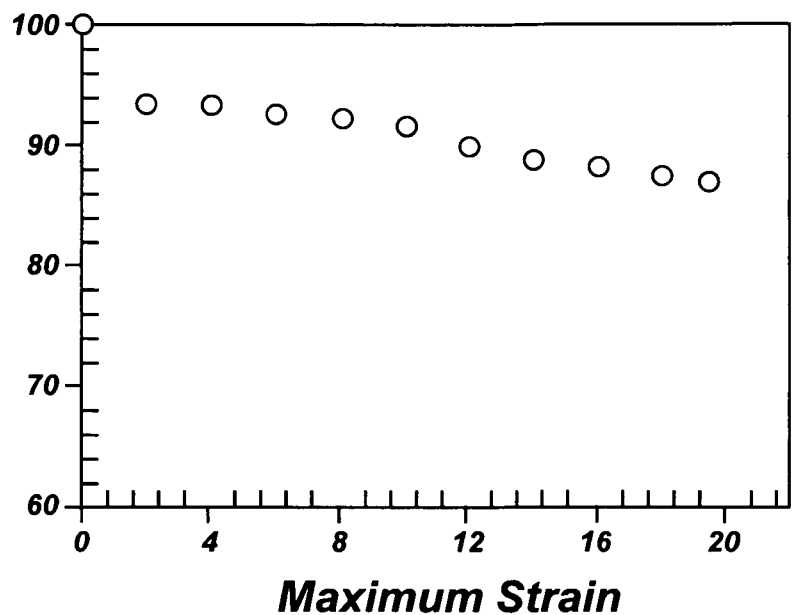
FIG. 2 shows the elastic recovery of the sPP-b-EPR-b-sPP (TsPP26.357EPR.66)/mineral oil gel (6.0 wt %) during the cyclic mechanical processing shown in FIG. 1.

FIG. 2 shows that the elastic recovery of the gel is more than 85% for all the strains applied. Below a strain of 12, the elastic recovery is more than 90%; beyond that the value is below 90%, but is still more than 85%. If after the final step in the cyclic deformation process has been carried out, the cyclic processing is repeated, the elastic recovery for strains of 16 and below is nearly 100%.

Figure 3:
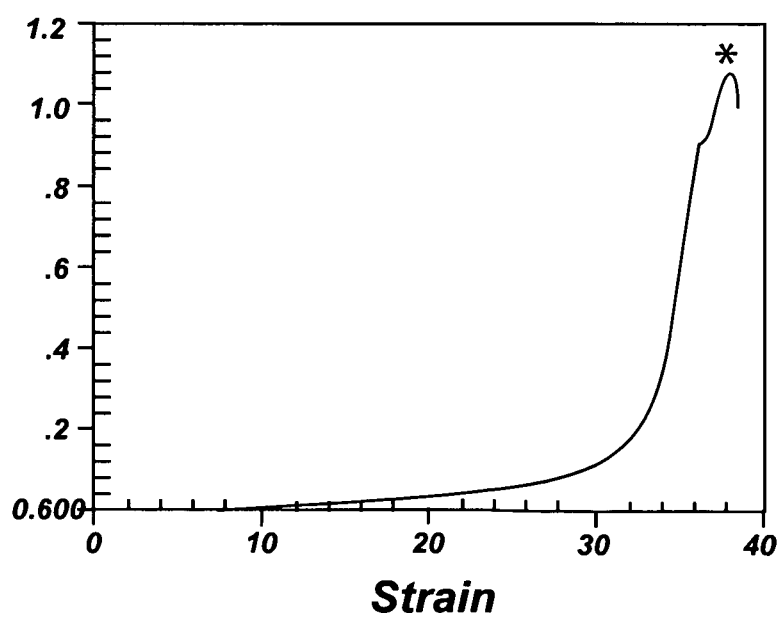
FIG. 3 shows a stress-strain graph of monotonically loaded sPP-b-EPR-b-sPP (TsPP26.357EPR.66)/mineral oil gel (6.0 wt %) after cyclic mechanical processing similar to that shown for the sample in FIG. 1.

FIG. 3 shows a single stress-strain curve under monotonic tensile loading of the sPP-b-EPR-b-sPP/mineral oil gel after cyclic mechanical processing. The sample shows a maximum strain of more than 36. The final stress is more than 1 MPa. Moreover, the stress at strains below 30 is much lower, less than 0.1 MPa. Note that the sPP-b-EPR-b-sPP copolymer mass concentration in the gel is only 6.0%. After the cyclic mechanical processing, the sPP-b-EPR-b-sPP/mineral oil gel shows extraordinary mechanical properties that usually cannot be obtained in either conventional elastomers (e.g. crosslinked rubber) or conventionally crosslinked gels, namely a very large strain at break (>36), a very high true stress before failure, computed by correcting the measured nominal stress values for the specimen area decrease at the tensile strain, of 36 MPa, and a failure stress based on the 6% of the final specimen area made up of polymer of ~600 MPa. This high strength-high elastic modulus property at large strains is combined with extreme softness (low elastic modulus) at low strains. This set of properties mimics that of human or animal skin as well as that of very soft leather, all of which show a pronounced low elastic modulus toe on the stress-strain curve. Moreover since the fracture of these tensile specimens invariably takes place immediately adjacent to the grips, where large stress concentrations must exist because of the inhomogeneity of strain, a homogeneously strained sample can be expected to have even larger strains and stresses to break. A further distinguishing feature of the present gel composition is that it can be melted and thermoplastically processed into any desired shape, unlike conventional chemically crosslinked rubbers and gels.

Figure 4:
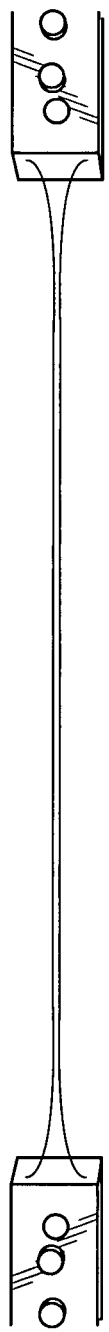
FIG. 4 is a photograph showing a monotonically loaded sPP-b-EPR-b-sPP (TsPP26.357EPR.66)/mineral oil gel after cyclic mechanical processing similar to that shown for the sample in FIG. 1. The photo was taken at a strain of 21.

FIG. 4 shows a monotonically loaded sPP-b-EPR-b-sPP/mineral oil gel after cyclic mechanical processing similar to that shown for the sample in FIG. 1 after a large strain of 21 had been achieved. The inhomogeneity in strain near the grips is easily observed.

EXAMPLE 2

Another triblock copolymer sPP-b-EPR-sPP was used for the similar studies. This sPP-b-EPR-sPP triblock copolymer had a total number average molecular weight Mn of 336 kg/mol, the total weight % of the sPP blocks was 32%, and the crystallinity Xc of the sPP in the undiluted sPP-b-EPR-b-sPP was 32.4% (by DSC measurement). This sPP-b-EPR-b-sPP triblock copolymer is abbreviated as TsPP32.336EPR.70. A polymeric material based composition comprised of this triblock copolymer and mineral oil diluent was prepared as follows: A mixture of ~5.4 weight % sPP-b-EPR-b-sPP powder (TsPP32.336EPR.70) in mineral oil was prepared. The mixture was heated in a vacuum oven to 170° C. for 15 h, and then annealed sequentially at the following temperatures: 150° C. for 3 h, 120° C. for 2 h and 100° C. for 27 h, then followed by slow cooling in the oven to room temperature. After this treatment the mixture was a clear and transparent gel. The gel samples were cut into rectangular specimens with thickness of about 0.5 mm, length of 7.3 mm and width of 2.0 mm for the mechanical processing and mechanical testing. The mechanical processing and testing were carried out using an Instron (Norwood, Mass.) 1123 tensile testing machine. The mechanical processing was performed as follows: Tensile cyclic processing was conducted stepwise at room temperature (20° C.) to progressively higher tensile strains. In each step, once the sample reached the appropriate tensile strain, the crosshead direction was reversed and the sample strain was decreased at the same nominal strain rate (~0.07 $\text{min}^{-1}$ based on the original sample length) until zero stress was achieved. The sample was then extended again at the same constant strain rate until it reached the next targeted step-strain. The cyclic processing was continued until in the final cycle the targeted strain was reached.

Figure 5:
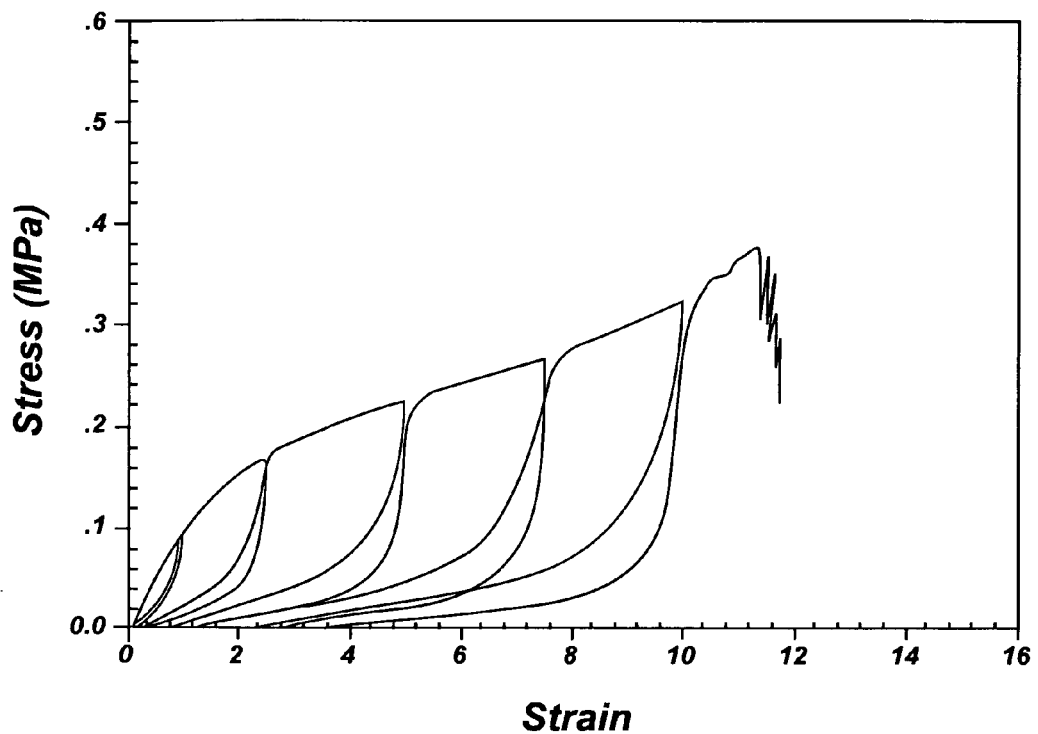
FIG. 5 shows the stress-strain curves of an sPP-b-EPR-sPP (TsPP32.336EPR.70)/mineral oil gel (5.4 wt %) during cyclic mechanical processing.

FIG. 5 shows the stress-strain curves of the sPP-b-EPR-sPP (TsPP32.336EPR.70)/mineral oil gel (5.4 wt %) during one cyclic mechanical processing treatment. The maximum strains were 0.1, 0.5, 1.0, 2.5, 5.0, 7.5, 10, and 12.5, respectively. While the gel sample is very elastic with an achievable strain of at least 10 without breakage, the cyclic mechanical processing completely transforms its stress-strain curve at low strains from one with a relatively high initial elastic modulus of ~100 kPa to one with a very low initial elastic modulus of ~9.8 kPa. The tangent modulus at high strains after the cyclic mechanical processing is much larger, approaching 0.4 MPa based on the initial sample area.

Figure 6:
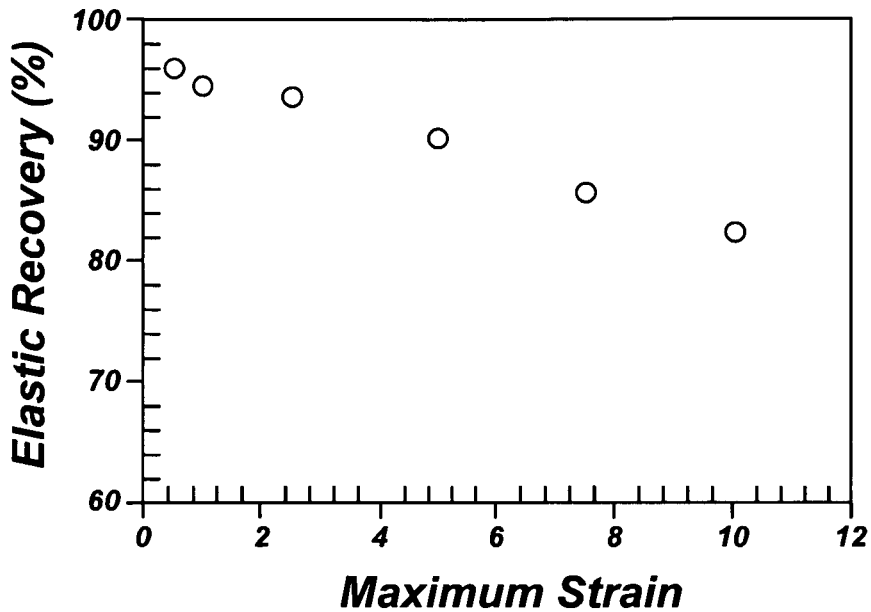
FIG. 6 shows the elastic recovery of the sPP-b-EPR-sPP (TsPP32.336EPR.70)/mineral oil gel (5.4 wt %) during the cyclic mechanical processing shown in FIG. 5.

FIG. 6 shows that the elastic recovery of the gel is more than 80% for all the strains applied. Below a strain of 6, the elastic recovery is more than 90%; beyond that the value is below 90%, but is still more than 80%.

Figure 7:
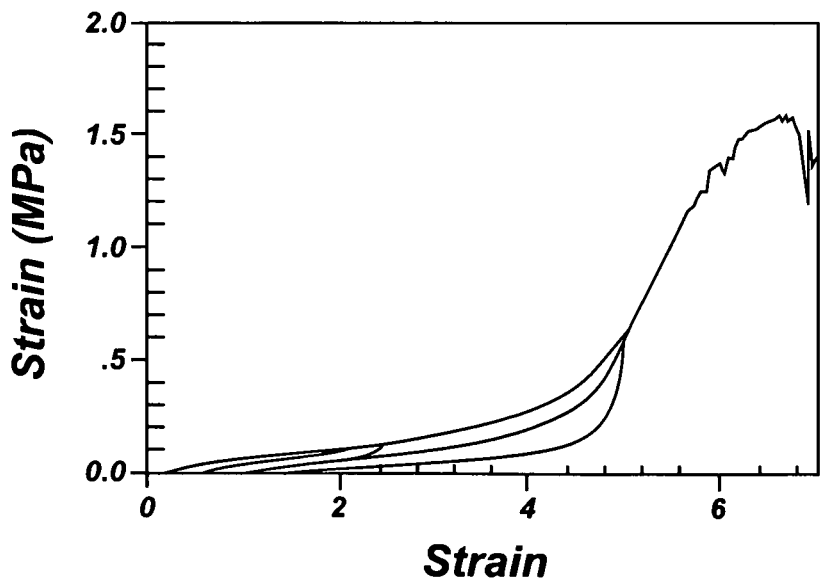
FIG. 7 shows the stress-strain curves of the sPP-b-EPR-sPP (TsPP32.336EPR.70)/mineral oil gel (5.4 wt %) during cyclic mechanical processing for the second time (the sample was previously mechanically processed as shown in FIG. 5).

FIG. 7 shows stress-strain curves of the sPP-b-EPR-b-sPP (TsPP32.336EPR.70)/mineral oil gel (5.4 wt %) under step cyclic test for the second time after the step cyclic test shown in FIG. 5. The sample shows a maximum strain of more than 7 based on the new sample dimensions. The final stress exceeds 1.5 MPa. Moreover, the stress at strains below 4 is much lower, less than 0.1 MPa.

Figure 8:
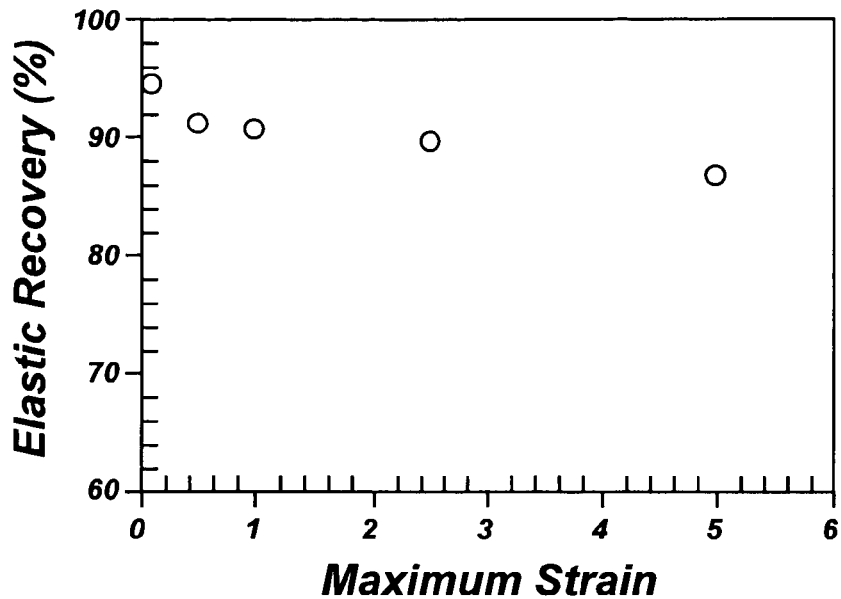
FIG. 8 shows the elastic recovery of the sPP-b-EPR-sPP (TsPP32.336EPR.70)/mineral oil gel (5.4 wt %) during the cyclic mechanical processing for the second time as shown in FIG. 7.

FIG. 8 shows that the elastic recovery of the step cyclic processed gel is greater than 90% when the maximum strain is less than 4 and the elastic recovery is more than 85% for maximum strains larger than 5.

EXAMPLE 3

A polymeric material based composition comprised of a triblock copolymer, polyethylene-b-ethylene-propylene-rubber-b-polyethylene (PE-b-EPR-b-PE), and mineral oil diluent was prepared as follows: A mixture of ~5.2 weight % PE-b-EPR-b-PE powder in mineral oil was prepared. The mixture was heated in a vacuum oven to 170° C. for 17 h, then was slowly cooled in the oven to room temperature. After this treatment, the mixture was a clear and transparent gel. The triblock copolymer PE-b-EPR-b-PE had a total number average molecular weight Mn of 166 kg/mol, and block lengths of 38 kg/mol (PE), 115 kg/mol (EPR) and 13 kg/mol (PE). The total weight % of the PE blocks was 31%, the melting point was 119° C., the degree of crystallinity Xc of the PE blocks was 37.1%, and the crystallinity Xc in the undiluted PE-b-EPR-PE was 11.5% (by DSC measurement). Wide angle X-ray scattering showed that the crystallinity of PE block crystals in the gel was about 0.94%. The gel samples were cut into rectangular specimens with thickness of about 0.5 mm, length of 7.3 mm and width of 2.0 mm for the mechanical processing and mechanical testing. The mechanical processing and testing were carried out using an Instron (Norwood, Mass.) 1123 tensile testing machine. The mechanical processing was preformed as follows: Tensile cyclic processing was conducted stepwise at room temperature (20° C.) to progressively higher tensile strains. In each step, once the sample reached the appropriate tensile strain, the crosshead direction was reversed and the sample strain was decreased at the same nominal strain rate (~0.07 $\text{min}^{-1}$ based on the original sample length) until zero stress was achieved. The sample was then extended again at the same constant strain rate until it reached the next targeted step-strain. The cyclic processing was continued until in the final cycle the targeted strain was reached.

Figure 9:
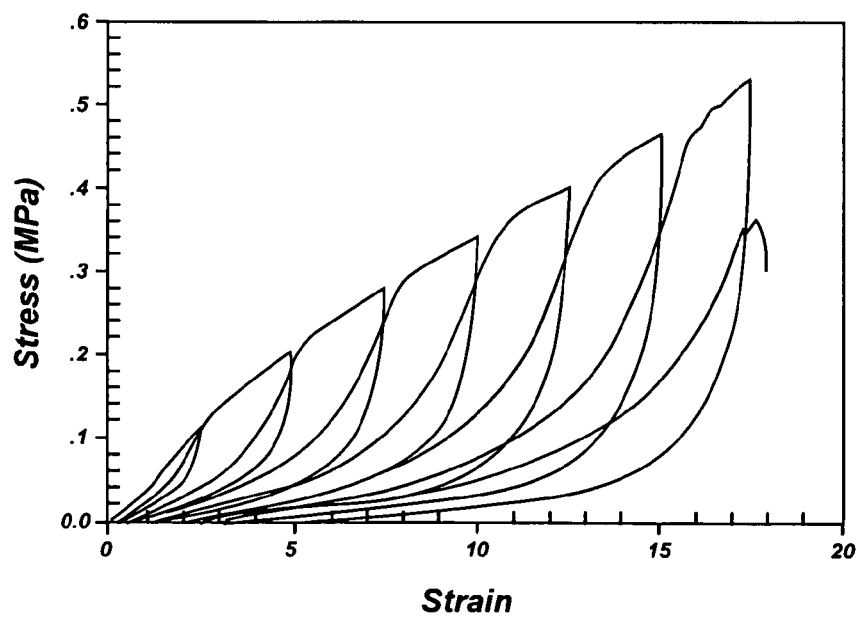
FIG. 9 shows the stress-strain curves of the PE-b-EPR-b-PE/mineral oil gel (5.2 wt %) during cyclic mechanical processing.

FIG. 9 shows the stress-strain curves during one cyclic mechanical processing treatment of the PE-b-EPR-b-PE gel. The maximum strains were 0.1, 0.5, 1.0, 2.5, 5.0, 7.5, 10, 12.5, 15, and 17.5, respectively. While the gel sample is very elastic with an achievable strain of at least 17.5 without breakage, the cyclic mechanical processing completely transforms its stress-strain curve at low strains from one with a relatively high initial elastic modulus of ~76 kPa to one with a very low initial elastic modulus of ~6 kPa. The tangent modulus at high strains after the cyclic mechanical processing is larger, approaching 0.6 MPa based on the initial sample area.

Figure 10:
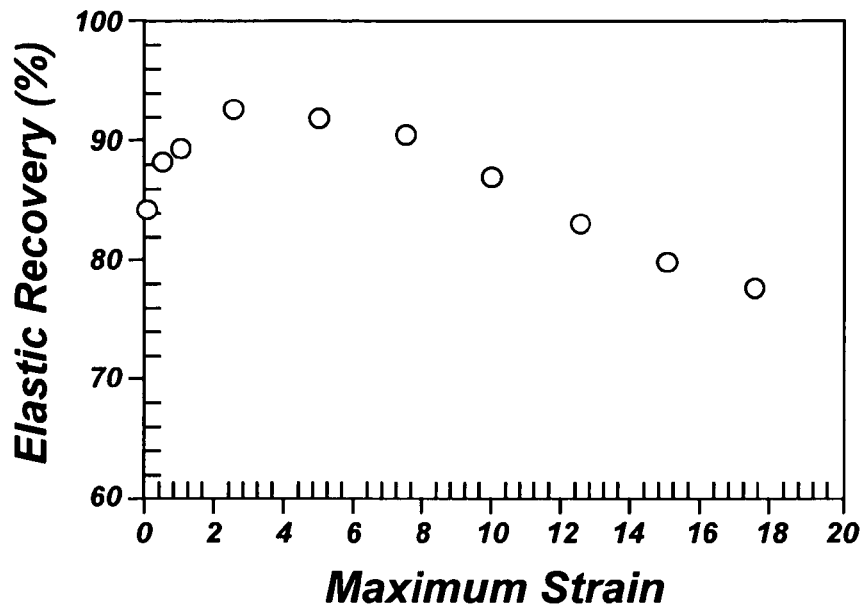
FIG. 10 shows the elastic recovery of the PE-b-EPR-b-PE/mineral oil gel (5.2 wt %) during the cyclic mechanical processing shown in FIG. 9.

FIG. 10 shows that the elastic recovery of the PE-b-EPR-b-PE gel is more than 75% for all the strains applied. Below a strain of 14, the elastic recovery is more than 80%; beyond that the value is below 80%, but is still more than 75%.

EXAMPLE 4

A polymeric material based composition comprised of a triblock copolymer, polyethylene-b-ethylene-propylene-rubber-b-polyethylene (PE-b-EPR-b-PE), and mineral oil diluent was prepared as follows: A mixture of ~16.9 weight % PE-b-EPR-b-PE powder in mineral oil was prepared. The mixture was heated in a vacuum oven to 170° C. for 17 h, and then was slowly cooled in the oven to room temperature. After this treatment the mixture was a clear and transparent gel. The triblock copolymer PE-b-EPR-b-PE had a total number average molecular weight Mn of 166 kg/mol, and block lengths of 38 kg/mol (PE), 115 kg/mol (EPR) and 13 kg/mol (PE). The total weight % of the PE blocks was 31%, the melting point was measured as 119° C., the degree of crystallinity Xc of the PE blocks was 37.1% and the crystallinity Xc in the undiluted PE-b-EPR-PE was 11.5% (by DSC measurement). Wide angle X-ray scattering showed that the crystallinity of PE block crystals in the gel was about 1.95%. The gel samples were cut into rectangular specimens with thickness of about 0.5 mm, length of 7.3 mm and width of 2.0 mm for the mechanical processing and mechanical testing. The mechanical processing and testing were carried out using an Instron (Norwood, Mass.) 1123 tensile testing machine. The mechanical processing was preformed as follows: Tensile cyclic processing was conducted stepwise at room temperature (20° C.) to progressively higher tensile strains. In each step, once the sample reached the appropriate tensile strain, the crosshead direction was reversed and the sample strain was decreased at the same nominal strain rate (~0.07 min$^{-1}$ based on the original sample length) until zero stress was achieved. The sample was then extended again at the same constant strain rate until it reached the next targeted stepstrain. The cyclic processing was continued until in the final cycle the targeted strain was reached.

Figure 11:
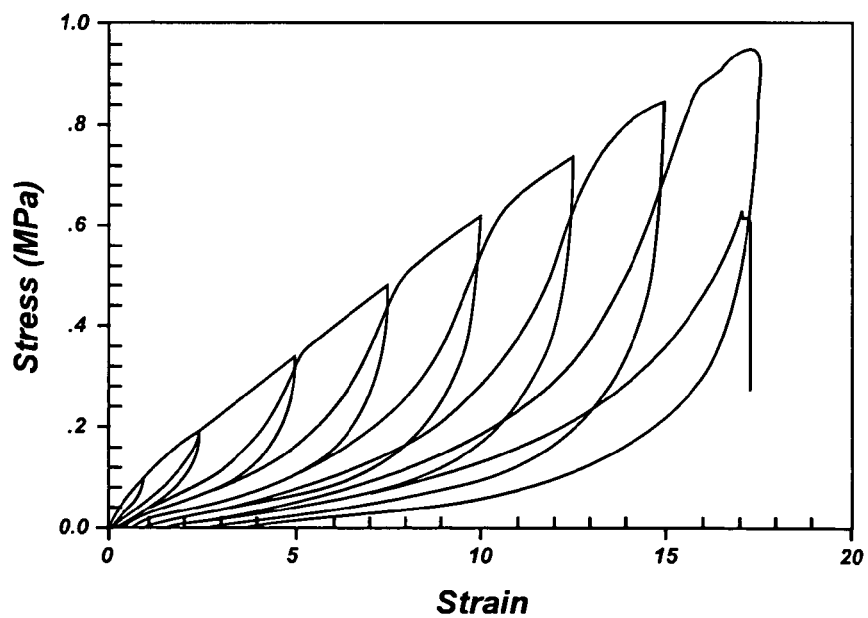
FIG. 11 shows the stress-strain curves of the PE-b-EPR-b-PE/mineral oil gel (16.9 wt %) during cyclic mechanical processing for the first time.

FIG. 11 shows the stress-strain curves during one cyclic mechanical processing treatment. The maximum strains were 0.1, 0.5, 1.0, 2.5, 5.0, 7.5, 10, 12.5, 15, and 17.5, respectively. While the gel sample is very elastic with an achievable strain of at least 17.5 without breakage, the cyclic mechanical processing completely transforms its stress-strain curve at low strains from one with a relatively high initial elastic modulus of ~200 kPa to one with a very low initial elastic modulus of ~14 kPa. The tangent modulus at high strains after the cyclic mechanical processing is much larger, approaching 1.0 MPa based on the initial sample area.

Figure 12:
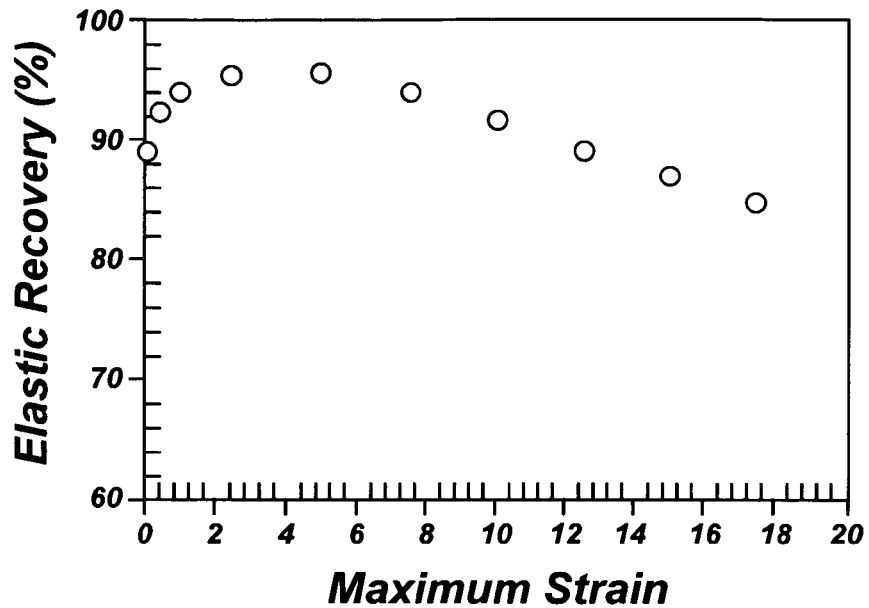
FIG. 12 shows the elastic recovery of the PE-b-EPR-b-PE/mineral oil gel (16.9 wt %) during the cyclic mechanical processing shown in FIG. 11.

FIG. 12 shows that the elastic recovery of the gel is more than 85% for all the strains applied. Below a strain of 10, the elastic recovery is more than 90%; beyond that the value is below 90%, but is still more than 85%.

Figure 13:
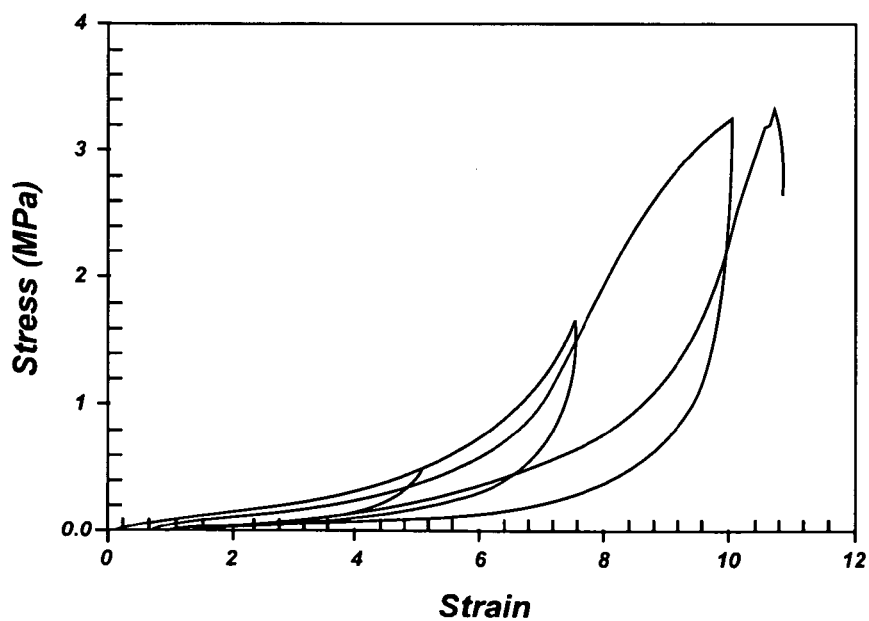
FIG. 13 shows the stress-strain curves of the PE-b-EPR-b-PE/mineral oil gel (16.9 wt %) during cyclic mechanical processing for the second time (the sample was previously mechanically processed as shown in FIG. 11).

FIG. 13 shows stress-strain curves of the PE-b-EPR-b-PE/mineral oil gel (16.9%) under step cyclic test for the second time after the step cyclic test shown in FIG. 11. The sample shows a maximum strain of more than 10 based on the new sample dimensions. The final stress is even more than 3 MPa. Moreover, the stress at strains below 3 is much lower, less than 0.1 MPa.

Figure 14:
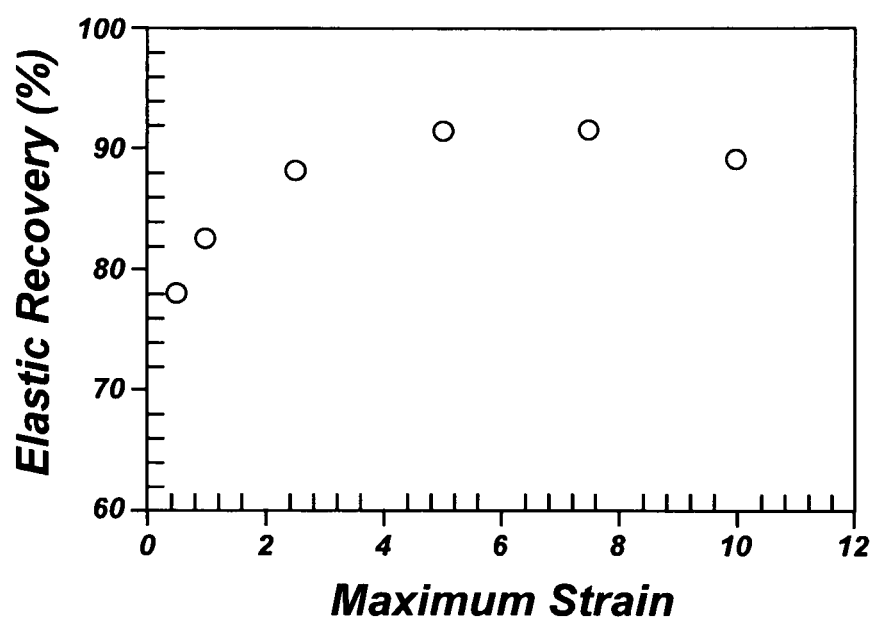
FIG. 14 shows the elastic recovery of the PE-b-EPR-b-PE/mineral oil gel (16.9 wt %) during the cyclic mechanical processing for the second time as shown in FIG. 13.

FIG. 14 shows that the elastic recovery of the twice step cyclic processed gel increases with the maximum strain when the maximum strain is less than 4 and the elastic recovery is more than 85% for the maximum strain larger than 4.

Figure 15:
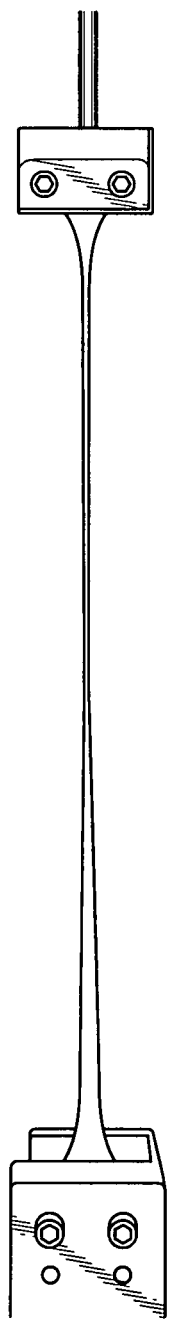
FIG. 15 shows a photo of the loaded PE-b-EPR-b-PE/mineral oil gel (16.9 wt %) during cyclic mechanical processing for the second time as shown in FIG. 13. The photo was taken at the strain of 10.6.

FIG. 15 shows the loaded PE-b-EPR-b-PE/mineral oil gel (16.9 wt %) during cyclic mechanical processing for the second time at the large strain of 10.6 as shown in FIG. 13. The inhomogeneity in strain near the grips is easily observed.

EXAMPLE 5

A polymeric material based composition comprised of a triblock copolymer, isotactic polypropylene-b-ethylene-propylene-rubber-b-isotactic polypropylene (iPP-b-EPR-b-iPP), and mineral oil diluent was prepared as follows: A mixture of ~10 weight % iPP-b-EPR-b-iPP powder in mineral oil was prepared. The mixture was heated in a vacuum oven to 170° C. for 17 h, and was then cooled slowly in the oven to room temperature. After this treatment, the mixture was a clear and transparent gel. The triblock copolymer iPP-b-EPR-b-iPP had a total number average molecular weight Mn of 235 kg/mol, and block lengths of 14 kg/mol (iPP), 206 kg/mol (EPR) and 15 kg/mol (iPP). The total weight % of the iPP blocks was 12%, the melting point was measured as 99° C., the degree of crystallinity Xc of the iPP blocks was 64.4% and the crystallinity Xc in the undiluted iPP-b-EPR-b-iPP was 7.7% (by DSC measurement, using a value for the enthalpy of crystallization of iPP of 209 J/g). DSC showed that the crystallinity of iPP block crystals in the gel was about 1.3%. The gel samples were cut into rectangular specimens with thickness of about 0.5 mm, length of 7.3 mm and width of 2.0 mm for the mechanical processing and mechanical testing. The mechanical processing and testing were carried out using an Instron (Norwood, Mass.) 1123 tensile testing machine. The mechanical processing was performed as follows: Tensile cyclic processing was conducted stepwise at room temperature (20° C.) to progressively higher tensile strains. In each step, once the sample reached the appropriate tensile strain, the crosshead direction was reversed and the sample strain was decreased at the same nominal strain rate (~0.07 min$^{-1}$ based on the original sample length) until zero stress was achieved. The sample was then extended again at the same constant strain rate until it reached the next targeted stepstrain. The cyclic processing was continued until in the final cycle the targeted strain was reached.

Figure 16:
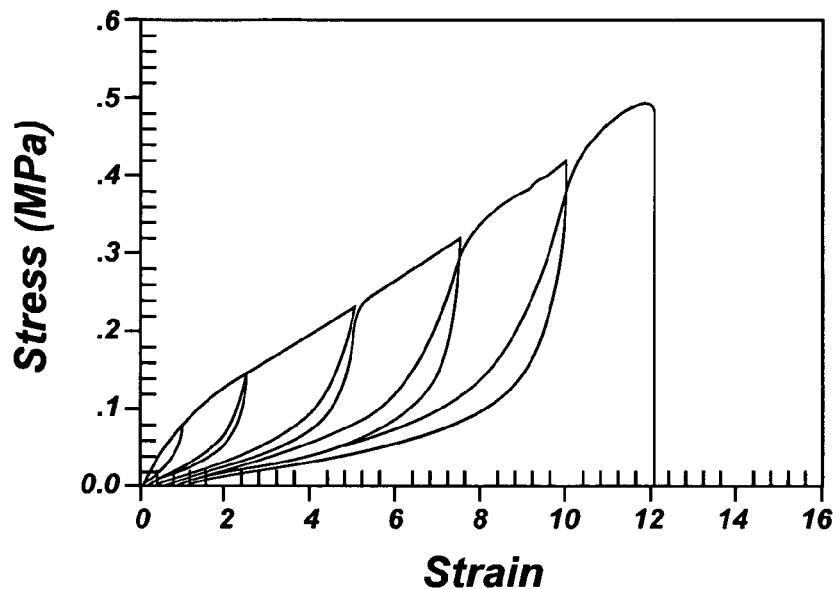
FIG. 16 shows the stress-strain curves of the iPP-b-EPR-b-iPP/mineral oil gel (10 wt %) during cyclic mechanical processing for the first time. The iPP-b-EPR-b-iPP neat sample has a melting point of 99° C.

FIG. 16 shows the stress-strain curves of the iPP-b-EPR-b-iPP gel sample during a first cyclic mechanical processing treatment. The maximum strains were 0.1, 0.5, 1.0, 2.5, 5.0, 7.5, 10, and 12.5, respectively. While the gel sample is very elastic with an achievable strain of at least 10 without breakage, the cyclic mechanical processing completely transforms its stress-strain curve at low strains from one with a relatively high initial elastic modulus of ~94 kPa to one with a very low initial elastic modulus of ~11 kPa. The tangent modulus at high strains after the cyclic mechanical processing is much larger, approaching 0.6 MPa based on the initial sample area.

Figure 17:
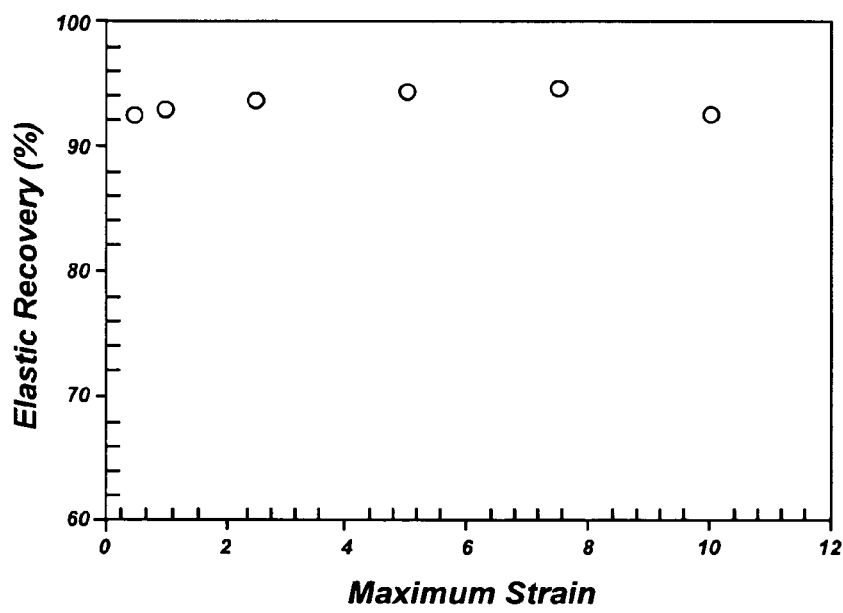
FIG. 17 shows the elastic recovery of the iPP-b-EPR-b-iPP/mineral oil gel (10 wt %) during the cyclic mechanical processing shown in FIG. 16. The iPP-b-EPR-b-iPP neat sample has a melting point of 99° C.

FIG. 17 shows that the elastic recovery of the gel is more than 90% for all the strains applied. The elastic recovery is remarkably constant for all the applied strains.

EXAMPLE 6

Figure 18:
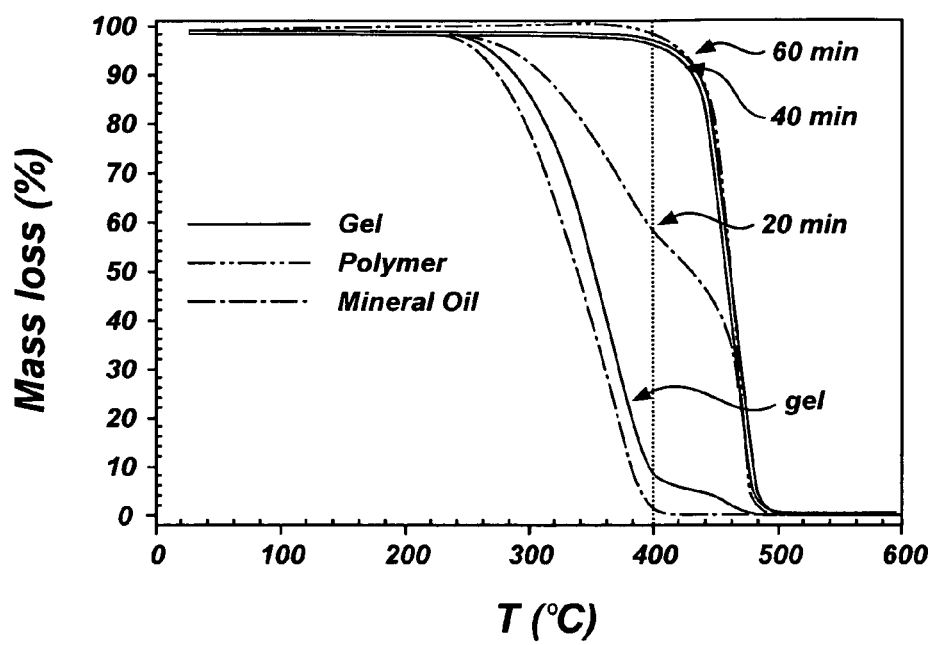
FIG. 18 shows the mass loss of the sPP-b-EPR-b-sPP (TsPP26.357EPR.66)/mineral oil gel (6 wt %), the neat sPP-b-EPR-b-sPP, and the extracted sPP-b-EPR-b-sPP samples for various extraction times.

In this example the mineral oil in a 6 wt. % sPP-b-EPR-sPP (sample TsPP26.357EPR.66) gel is extracted using hexane solvent in a Soxhlet extractor for a time of 40 minutes or more. Thermal gravimetric analysis curves of the extracted samples are shown in FIG. 18. It can be seen from the figure that an extraction time of 20 minutes is not sufficient to extract the mineral oil from the gel samples, while virtually all mineral oil is extracted after 40 minutes.

Figure 19:
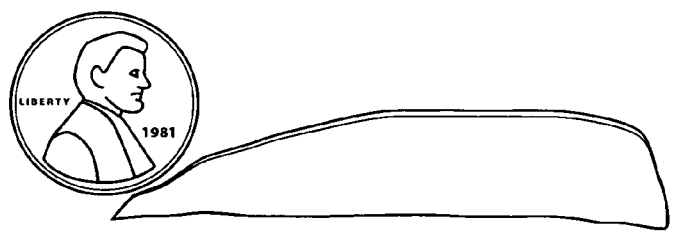
FIG. 19 shows a photograph of a 6 wt % sPP-b-EPR-b-sPP (TsPP26.357EPR.66) gel sample from which the mineral oil has been extracted.

FIG. 19 shows a photograph of a piece of the sPP-b-EPR-b-sPP (TsPP26.357EPR.66) gel film from which mineral oil has been extracted by the procedure detailed above. The oil-extracted sample is seen to be transparent.

Figure 20:
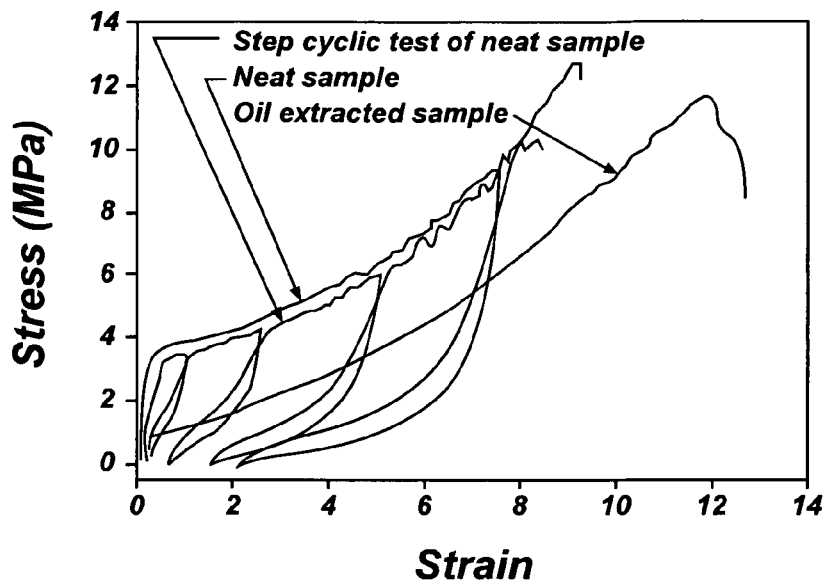
FIG. 20 shows the stress-strain curves of the neat sPP-b-EPR-b-sPP sample (monotonic and cyclic tensile tests) and the oil-extracted sample (monotonic test).

FIGS. 20 through 23 relate to two sPP-b-EPR-b-sPP compositions that were prepared by different procedures. The "neat" sample was produced by slow cooling of material TsPP26.357EPR.66 from the melt state at a temperature of 170° C. to room temperature. The "oil-extracted" sample was produced by forming a 6 wt. % gel of TsPP26.357EPR.66 in mineral oil and then extracting the mineral oil using hexane as described above. After these two materials were prepared, they were subjected to a variety of mechanical tests. FIG. 20 shows the monotonic tensile stress-strain curve of the oil-extracted sample in comparison with the monotonic and step cyclic stress-strain curves of the neat sample. The oil-extracted sample shows a smaller initial Young's modulus, a higher true stress at break, and a higher strain at break in comparison with the neat sample.

Figure 21:
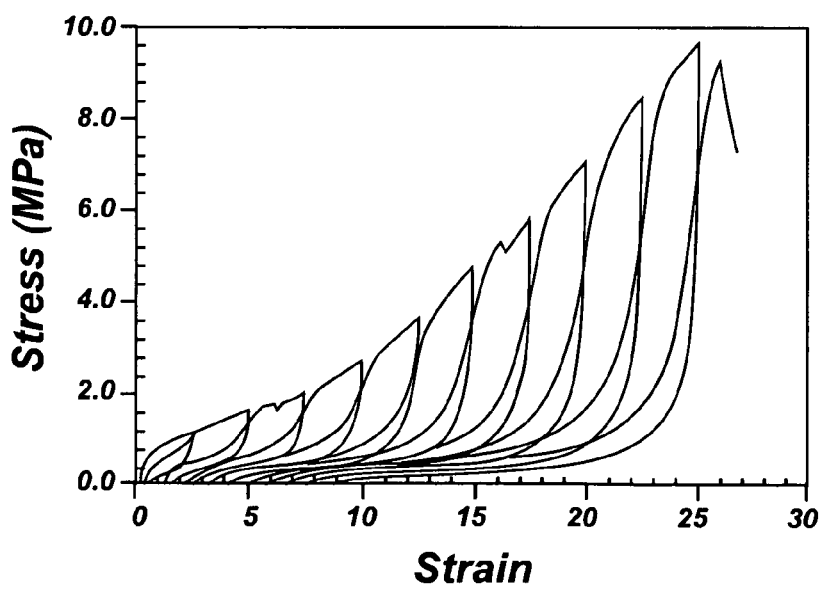
FIG. 21 shows the stress-strain curves of the oil-extracted sample during step cyclic mechanical testing.

FIG. 21 shows tensile cyclic stress-strain curves of the oil-extracted block copolymer sample. Subsequent to this cyclic processing, the oil-extracted sample shows a lower initial Young's modulus, a very large maximum tangent modulus, and can be strained to much larger values in comparison with the monotonic test (FIG. 20). In the last loading cycle, the initial Young's modulus is ~7 MPa and the maximum tangent modulus is ~870 MPa based on the true stress.

The modulus thus increases by over a factor of 100 as the block copolymer is stretched. The true stress at failure is >200 MPa, a remarkable value.

Figure 22:
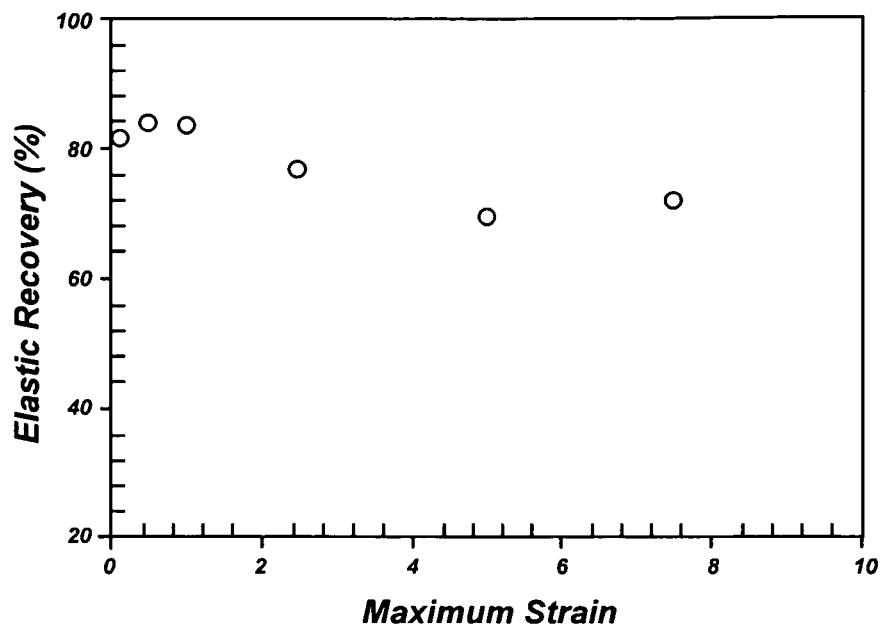
FIG. 22 shows the elastic recovery of the neat sPP-b-EPR-b-sPP sample during the cyclic mechanical test shown in FIG. 20.
Figure 23:
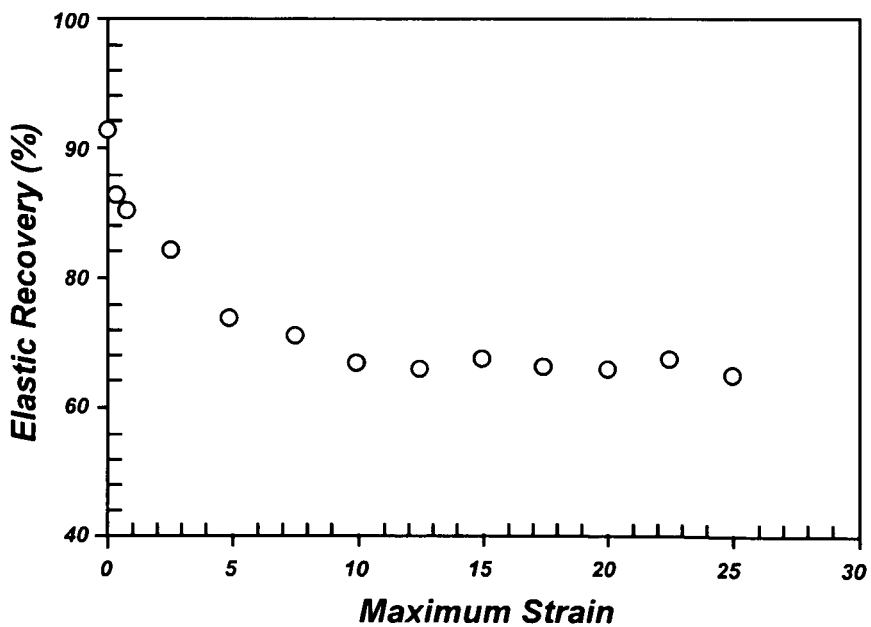
FIG. 23 shows the elastic recovery of the oil-extracted sample during the step cyclic mechanical test shown in FIG. 21.

FIGS. 22 and 23 show the elastic recovery of the neat sample and the oil-extracted sample, respectively, after various tensile strains. The elastic recovery of the two samples is broadly similar. The initial Young's modulus for the oil-extracted sample, after cyclic mechanical processing to a comparable plastic strain, is lower (~4 MPa) than that for the neat sample (~10 MPa) because there are fewer entanglements between the EPR segments in the oil-extracted sample.

EXAMPLE 7

Figure 24:
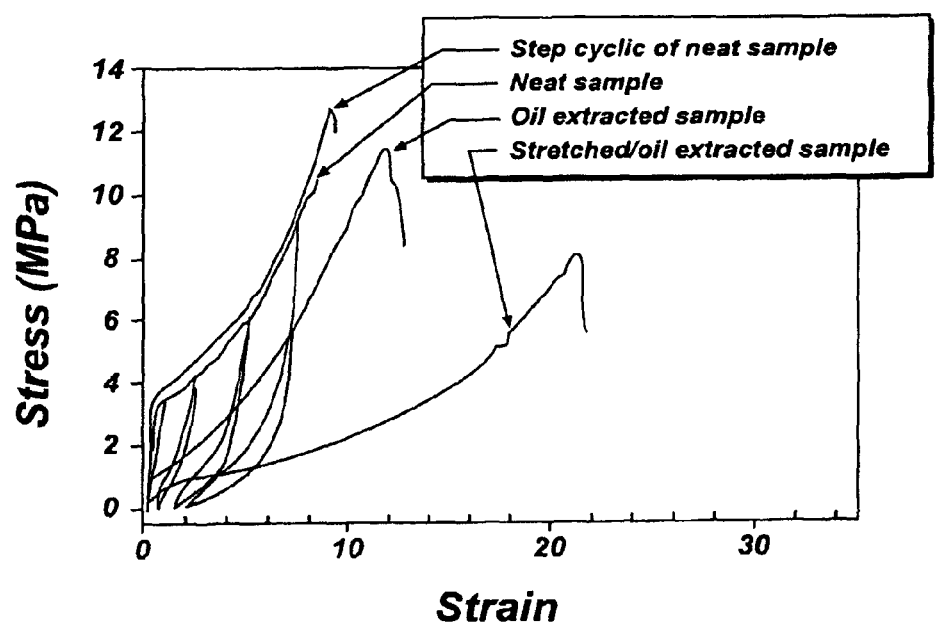
FIG. 24 shows the stress-strain curves of the neat sPP-b-EPR-b-sPP sample (monotonic and step cyclic tests), the oil-extracted sample (monotonic test), and the stretched/oil-extracted sample (monotonic test).

Example 7 demonstrates that the 6 wt % sPP-b-EPR-b-sPP (TsPP26.357EPR.66) gel can be monotonically stretched before the mineral oil is extracted. By such a procedure, a stretched, then oil extracted, sample can be produced. FIG. 24 shows the monotonic stress-strain curve of such a "stretched/oil-extracted" sample compared with the "neat" and "oil-extracted" samples described in Example 6. The stretched/oil-extracted sample shows the lowest initial Young's modulus and is highly extensible, and has a high true stress (~200 MPa) at failure. Together, Examples 6 and 7 show that a family of compositions with a variety of exceptional elastomeric properties can be produced by varying the order of the oil-extraction and mechanical processing steps, as well as the type and extent of mechanical processing applied.

EXAMPLE 8

To demonstrate the importance of the semicrystalline nature of the block copolymer to the present invention, we prepared a gel composition comprised of 5.1 wt % of a conventional SBC thermoplastic elastomer, a triblock copolymer with a hydrogenated midblock of styrene-b-ethylene-r-butylene-b-styrene (SEBS) (Kraton G1652M, a symmetric triblock copolymer with 29 wt. % of styrene and a total molecular weight of 50 kg/mol), in mineral oil. The SEBS gel composition was prepared identically to the sPP-b-EPR-b-sPP/mineral oil gels and the PE-b-EPR-b-PE/mineral oil gels in Examples 1-4. The mechanical strength of SEBS relies on the amorphous polystyrene end blocks of the SEBS microphase separating into glassy domains that act as physical crosslinks. The SEBS gel composition was subjected to cyclic mechanical processing and testing as in Examples 1-6. We observed that the SEBS gel was very brittle such that the maximum strain that could be obtained was 0.8, much lower than the strains of 36 and 10 achieved for the sPP-b-EPR-b-sPP/mineral oil gels in Examples 1 and 2, respectively, and other strain values for the PE-b-EPR-b-PE/mineral oil gels in Examples 3 and 4. The stress-strain curve of the SEBS gel was linear and the stress at failure of the SEBS gel was less than 0.02 MPa.

EXAMPLE 9

To demonstrate further the importance of the semicrystalline nature of the block copolymer to the present invention, a gel composition comprised of 5.3 wt % of a second conventional commercial thermoplastic elastomer, a triblock copolymer of styrene-b-ethylene-r-butylene-b-styrene (SEBS) (Kraton G1651H), was prepared in mineral oil identically to the mineral oil gels in Examples 1-4. Kraton G1651H has Mw=174 kg/mol, polydispersity=1.09, styrene/rubber ratio=33/67 wt/wt, and block lengths of 29 kg/mol (PS), 116 kg/mol (EB), and 29 kg/mol (PS). The mechanical strength of this higher molecular weight SEBS also relies on the amorphous polystyrene end blocks of the SEBS microphase separating into glassy domains that act as physical crosslinks. The SEBS gel composition was subjected to cyclic mechanical processing and testing as in Example 1. After cyclic mechanical processing we observed that although this higher molecular weight SEBS gel had a relatively high strain to failure, 15, and an excellent elastic recovery of over 90%, its initial elastic modulus was higher (4.5 kPa) and its tangent modulus at high strains was much lower (~100 kPa) than the sPP-b-EPR-b-sPP/mineral oil gel of Example 1. In addition its stress at failure (~0.2 MPa) was significantly lower than that (~1 MPa) of the sPP-b-EPR-sPP/mineral oil gel of Example 1.

Comparing the mechanical test results from Examples 1-9 indicates that the exceptional properties attained for the cyclic deformation processed sPP-b-EPR-b-sPP/mineral oil gels, the PE-b-EPR-b-PE/mineral oil gels, and the iPP-b-EPR-iPP/mineral oil gel cannot be obtained by cyclic deformation processing of comparable SEBS/mineral oil gels. This demonstrates the importance of the semicrystalline hard blocks in the block copolymer component to the unique properties of the claimed compositions.

REFERENCES

1. J. A. Brydson, Plastic Materials (6$^{th}$ Ed., Butterworth Heinemann, Oxford, 1995).
2. G. J. Domski, J. M. Rose, G. W. Coates, A. D. Bolig, M. S. Brookhart, *Prog. Polym. Sci.* 11, 1 (2006).
3. A. Hotta, E. Cochran, J. Ruokolainen, V. Khanna, G. H. Fredrickson, E. J. Kramer, Y.-W. Shin, F. Shimizu, A. E. Cherian, P. D. Hustad, J. M. Rose, and G. W. Coates, *Proc. Natl. Acad. Sci.* 103, 15327 (2006).
4. WO 2005/090427A2.
5. H. P. Wang, D. U. Khariwala, W. Cheung, S. P. Chum, A. Hiltner and E. Baer, *Macromolecules* 40 DOI: 10.1021/ma061680e (2007).
6. U.S. Pat. No. 6,867,253.
7. P. Smith, P. J. Lemstra, B. Kalb, and A. J. Pennings, *Polymer Bull.* 1, 733 (1979).
8. P. Smith and P. J. Lemstra, *Makromol. Chem.* 180, 2983 (1979).
9. *Proc. Natl. Acad. Sci.* 103, 15327-15332 (2006).

The invention claimed is:

1. A polymer gel composition comprising a mixture of (a) one or more semicrystalline polyolefin block or graft copolymers and (b) one or more fluid diluents, wherein:
   each semicrystalline polyolefin copolymer is an A-B block or graft co-polymeric material comprised of two or more blocks or grafts of a semicrystalline polyolefin A bridged by one or more blocks of an amorphous polyolefin B;
   each fluid diluent is miscible or partially miscible with the amorphous B blocks of the semicrystalline block copolymer, and does not dissolve crystals of the semicrystalline A blocks or grafts of the semicrystalline block or graft copolymer;
   said crystals of the semicrystalline A blocks or grafts of the semicrystalline block or graft copolymer have been deformed by a mechanical or thermomechanical process to produce a material having an initial elastic modulus at strains less than 1, an elastic tangent modulus at large strains just prior to break, the ratio of the tangent modulus prior to break to the initial modulus exceeding 50, and those large strains being more than 70% recovered when the stress or restraining force is removed.

2. The composition of claim 1, wherein the strain just prior to break is greater than 5.

3. The composition of claim 1 wherein the semicrystalline polyolefin block copolymer is an ABA triblock copolymer, an ABABA pentablock copolymer, or an (AB)n radial block copolymer.

4. The composition of claim 1 wherein the semicrystalline polyolefin block copolymer is a multiblock copolymer with architecture . . . ABABAB . . . , with block sizes and number of blocks per chain determined by a statistical process, and where the number average molecular weight of the A semicrystalline blocks is greater than 500 g/mole and the number average molecular weight of the B amorphous blocks is greater than 1000 g/mole.

5. The composition of claim 1 wherein the semicrystalline polyolefin block copolymer is a graft copolymer comprised of an amorphous B backbone of number average molecular weight greater than 1000 g/mole to which is attached two or more grafts (branches) of semicrystalline polymer A, the grafts having number average molecular weight greater than 500 g/mole.

6. The compositions of claim 1 wherein the A polymer blocks or grafts are semicrystalline polyolefins selected from the group consisting of polyethylene, syndiotactic polypropylene, isotactic polypropylene, isotactic poly(1-butene), syndiotactic poly(1-butene), isotactic or syndiotactic higher alpha-olefins, and isotactic or syndiotactic variants of poly(4-methyl-1-pentene), poly(3-methyl-1-butene), poly(4,4-dimethyl-1-pentene), and poly(vinylcyclohexane).

7. The compositions of claim 1 wherein the amorphous B polymer blocks are polyolefin selected from the group consisting of atactic or regio-irregular polypropylenes, atactic poly(alphaolefins), poly(ethylene-r-propylene), poly(ethylene-r-butene), poly(ethylene-r-pentene), poly(ethylene-r-hexene), poly(ethylene-r-heptene), poly(ethylene-r-isobutylene), poly(ethylene-r-octene) and atactic or regio-irregular random or statistical copolymers formed by copolymerization of propylene with one or more higher alpha-olefins and with or without ethylene.

8. The compositions of claim 1 wherein the amorphous B polymer blocks are polyolefin compounds produced by hydrogenation of polyisoprenes, polybutadienes, or their random copolymers and wherein the semicrystalline A polymer blocks or grafts are polyolefin compounds produced by hydrogenation of polybutadiene.

9. The compositions of claim 1 wherein the fluid diluent is an organic compound.

10. The compositions of claim 1 wherein the fluid diluent is carbon dioxide in liquid, vapor or supercritical fluid form.

11. The polymer gel composition of claim 1, wherein an A-B block or graft copolymer with two or more blocks or grafts of a semicrystalline polyolefin A, bridged by one or more blocks of an amorphous polyolefin B, is mixed with a second polyolefin C-D block or graft co-polymeric material comprised of two or more blocks or grafts of a semicrystalline polyolefin C bridged by one or more blocks of an amorphous polyolefin D, wherein polymers B and D are either the same or different, wherein the fluid diluent is miscible or partially miscible with the amorphous B and D blocks, and does not dissolve the crystals of the semicrystalline A and C blocks or grafts, and wherein the crystals of A and C can be deformed.

12. The composition of claim 11 wherein the semicrystalline polyolefin block copolymers is a mixture of an ABA triblock copolymer and a CDC triblock copolymer.

13. The composition of claim 11 wherein the semicrystalline polyolefin block copolymers is a mixture of a multiblock copolymer of architecture . . . ABABAB . . . having block sizes and number of blocks per chain determined by a statistical process, and where the A semicrystalline polyolefin blocks have a number average molecular weight of greater than 500 g/mole and the B amorphous polyolefin blocks have a number average molecular weight of greater than 1000 g/mole, with a second semicrystalline polyolefin block copolymer of CDC triblock architecture, or architecture . . . CDCDC . . . having block sizes and number of blocks per chain determined by a statistical process, and where the C semicrystalline blocks have a number average molecular weight of greater than 500 g/mole and the D amorphous polyolefin blocks have a number average molecular weight of greater than 1000 g/mole, and including the situation where polymers B and D are the same.

14. The compositions of claims 11 wherein the A and C polyolefin blocks or grafts are compounds selected from the group consisting of semicrystalline polyethylene, syndiotactic polypropylene, isotactic polypropylene, isotactic poly(1-butene), syndiotactic poly(1-butene), isotactic or syndiotactic higher alpha-olefins, and isotactic or syndiotactic variants of poly(4-methyl-1-pentene), poly(3-methyl-1-butene), poly(4,4-dimethyl-1-pentene), and poly(vinylcyclohexane).

15. The compositions of claims 11 wherein the amorphous B and D polyolefin blocks are selected from the group consisting of atactic or regio-irregular polypropylenes, atactic poly(alphaolefins), poly(ethylene-r-propylene), poly(ethylene-r-butene), poly(ethylene-r-pentene), poly(ethylene-r-hexene), poly(ethylene-r-heptene), poly(ethylene-r-isobutylene), poly(ethylene-r-octene) and atactic or regio-irregular random or statistical copolymers formed by copolymerization of propylene with one or more higher alpha-olefins and with or without ethylene.

16. The compositions of claims 11 wherein the amorphous B polymer blocks are polyolefin compounds produced by hydrogenation of polyisoprenes, polybutadienes, or their random copolymers and wherein the semicrystalline A polymer blocks or grafts are polyolefin compounds produced by hydrogenation of polybutadiene.

17. The compositions of claims 11 wherein the fluid diluent is a liquid organic compound.

18. The compositions of claims 11 wherein the fluid diluent is carbon dioxide in liquid, vapor or supercritical fluid form.

19. The composition of claim 1 wherein the semicrystalline block copolymer is an A-B-C polyolefin triblock copolymer comprised of semicrystalline A and C polyolefin blocks, bridged by an amorphous polyolefin block B, and wherein each fluid diluent is miscible or partially miscible with the amorphous B blocks of the semicrystalline block copolymer, and does not dissolve the crystals of the semicrystalline A and C blocks of the semicrystalline block copolymer.

20. A polymer gel composition comprising one or more semicrystalline polyolefin block or graft copolymers, wherein each semicrystalline polyolefin copolymer is an A-B block or graft co-polymeric material comprised of two or more blocks or grafts of a semicrystalline polyolefin A bridged by one or more blocks of an amorphous polyolefin B;

said semicrystalline A blocks or grafts of the semicrystalline block or graft copolymer comprises crystals that are further deformed by a mechanical or thermomechanical process to produce a material having an initial elastic modulus at strains less than 1, an elastic tangent modulus at large strains just prior to break, the ratio of the tangent modulus prior to break to the initial modulus exceeding 50, and those large strains being more than 70% recovered when the stress or restraining force is removed; and said semicrystalline polyolefin copolymer further comprising amorphous domains that have been previously swelled with a fluid diluent that is subsequently removed from the composition after the A blocks or grafts of the semicrystalline polyolefin block or graft copolymers have crystallized, either before or after the crystals are deformed by the mechanical or thermomechanical process.

21. The polymer gel composition of claim 20 wherein:

the A-B block or graft copolymer with two or more blocks or grafts of a semicrystalline polyolefin A, bridged by one or more blocks of an amorphous polyolefin B, is mixed with a second polyolefin C-D block or graft copolymeric material comprised of two or more blocks or grafts of a semicrystalline polyolefin C bridged by one or more blocks of an amorphous polyolefin D, wherein polymers B and D are either the same or different, wherein the fluid diluent is miscible or partially miscible with the amorphous B and D blocks, and does not dissolve the crystals of the semicrystalline A and C blocks or grafts, and wherein the crystals of A and C can be deformed;

said amorphous domains have been previously swelled with a fluid diluent that is subsequently removed from the composition after the A and C blocks or grafts of the semicrystalline polyolefin block or graft copolymers have crystallized, either before or after the crystals are deformed by the mechanical or thermomechanical process.

22. The compositions of claim 9, wherein the organic compound is selected from the group consisting of mineral oil, paraffin oil, plasticizer, solvent, and a tackifier.

23. The compositions of claim 9, wherein the organic compound is decalin.

24. The compositions of claim 11, wherein the organic compound is selected from the group consisting of mineral oil, paraffin oil, plasticizer, solvent, and a tackifier.

25. The compositions of claim 11, wherein the organic compound is decalin.

\* \* \* \* \*